Patented Apr. 14, 1936

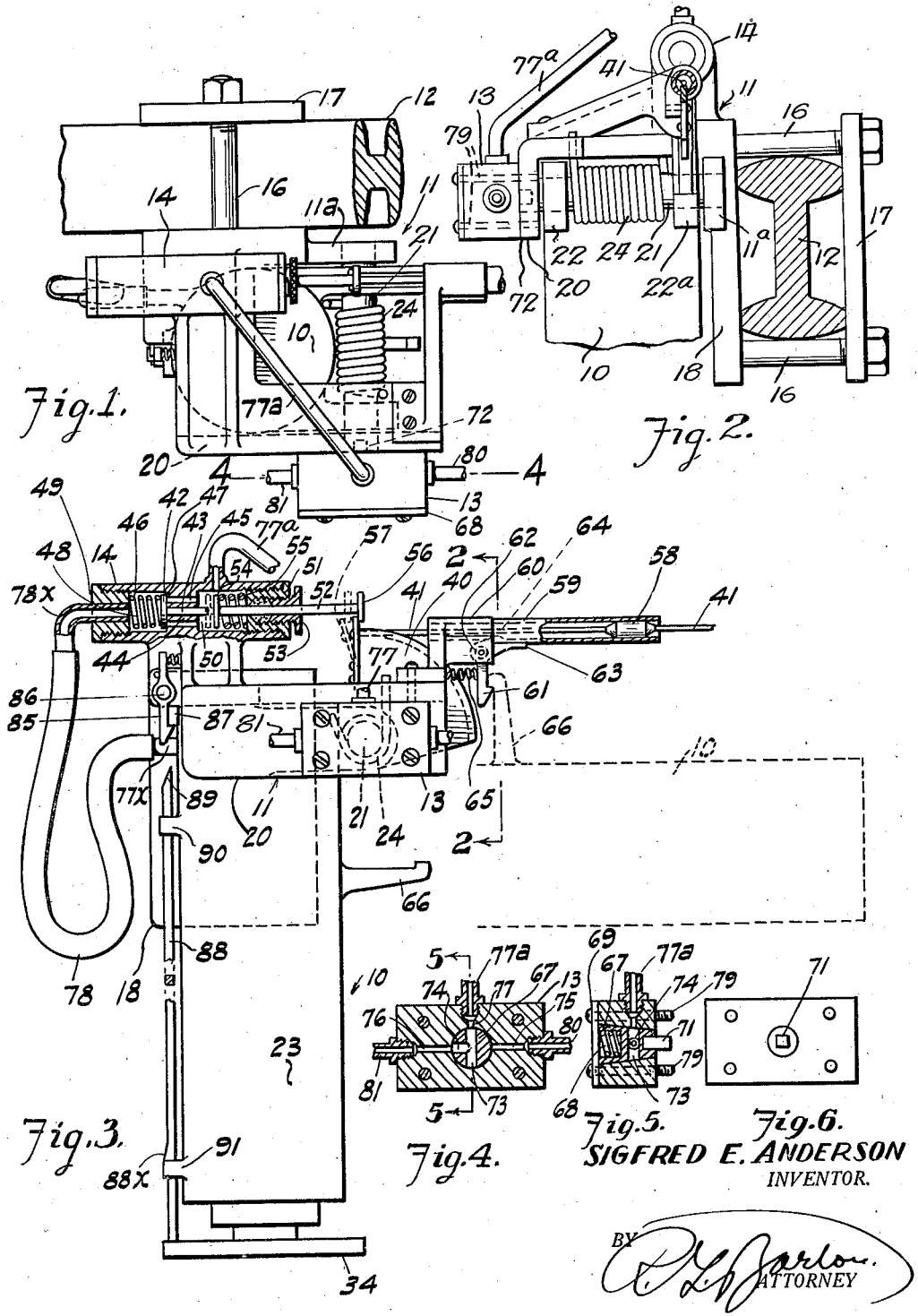

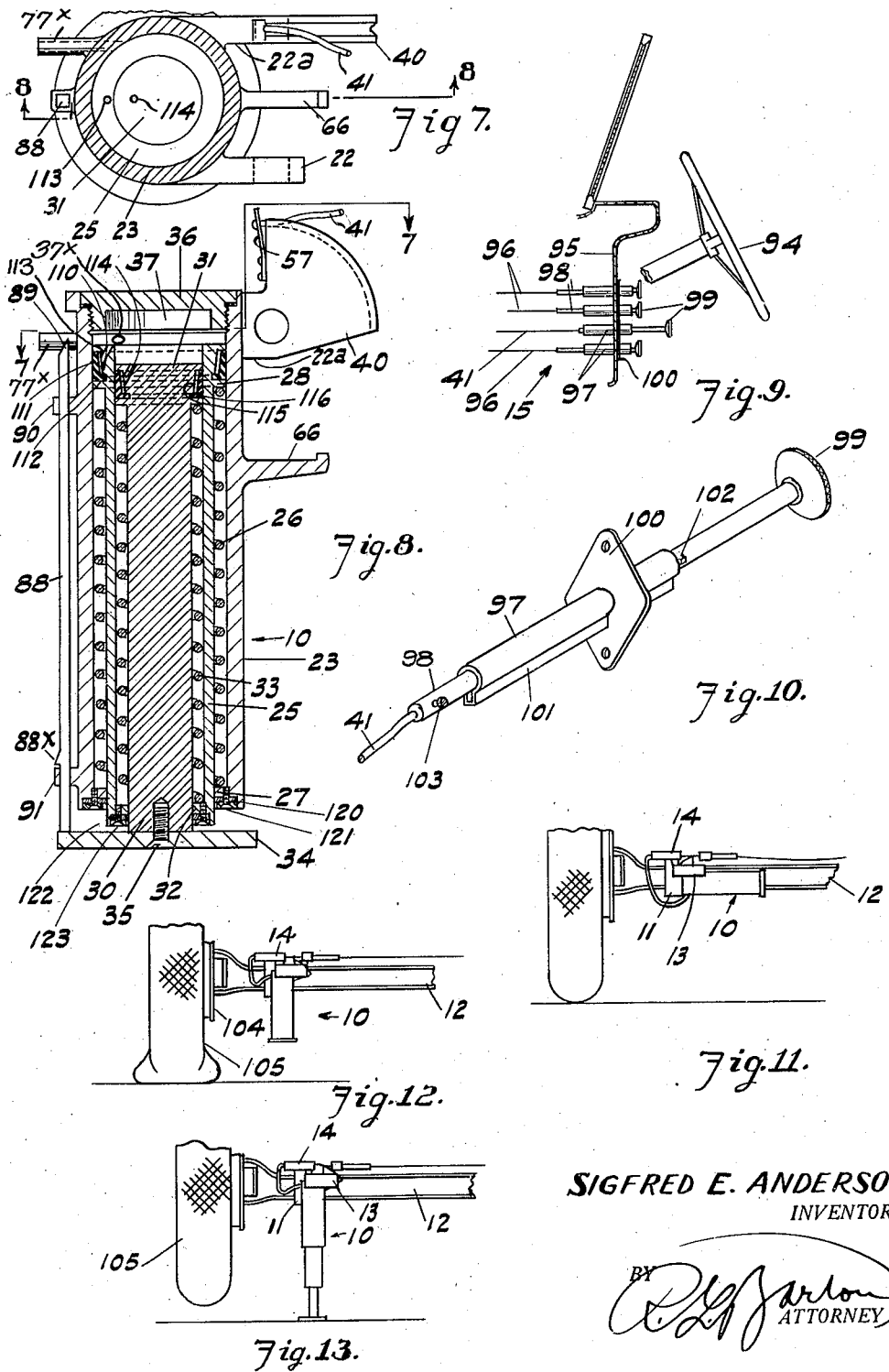

2,037,298

UNITED STATES PATENT OFFICE 2,037,298

HYDRAULIC JACK

Sigfred E. Anderson, Los Angeles, Calif.

Application June 19, 1935, Serial No. 27,382

13 Claims. (Cl. 254—86)

My invention relates to improvements in vehicular jacks and particularly to a jack for use in connection with raising the wheels of automobiles.

An important object of the invention is to provide a lifting jack, swingably attached to the chassis or axle of a vehicle, which is adapted to swing from a horizontal rest position to an operative pendant position.

An important object of the invention is to provide a jack as set forth in the preceding object having means to releasably maintain the jack in either its horizontal or pendant positions.

An important object of the invention is to provide a jack as set forth in the preceding paragraphs having remotely operable means to manually swing the jack to a pendant operative position and automatic means to restore the jack to its normal horizontal position.

An important object of the invention is to provide a hydraulic jack, extensibly operated by fluid pressure and mounted on an axle of an automobile to swing from a laterally extending position to a pendant position, in combination with means whereby the operation of swinging the jack down to a pendant position causes valve mechanism to be automatically actuated to supply an operating fluid under pressure to extend the jack.

A further object of the invention is to provide a jack wherein, the operation of swinging the jack from an inoperative position to an operative position simultaneously operates a valve mechanism cutting off communication of the master brake cylinder with the individual brake cylinders, thereby placing it in communication with the jack's fluid chamber; and then restoring the jack to its inoperative position restores the valve mechanism to its original position.

It is a further object of the invention to provide a lifting jack as a permanent fixture of an automobile or other vehicle, positioned adjacent the brake cylinder of each operating wheel thereof which can be operated from the driver's compartment and used in conjunction with the brake pedal and employing the same reservoir and pipe lines as for the brakes thereby eliminating extra levers and other auxiliary mechanism.

It is a still further object of the invention to provide a bodily disappearing jack whose position on the axle while in the inoperative position will maintain standard clearance between it and the roadbed.

With such objects in view, and others which will appear as the description proceeds, the invention comprises various novel features of construction and arrangement of parts which will be set forth with particularity in the following description and the subject matter claimed.

Referring to the accompanying drawings, which illustrate what is at present deemed to be a preferred embodiment of the invention, Fig. 1 is a plan view of one of the individual lifting jacks including a fragment of the vehicle frame to which it is attached.

Fig. 2 is a right hand projected elevation of the structure shown in Fig. 1, the extensible portion of the jack being shown in its operative position.

Fig. 3 is a side elevation of the structure shown in Fig. 1, the jack being in the operative or down position in both of these views and the dotted line of Fig. 3 indicating the normal or inoperative position thereof.

Fig. 4 is a section of one of the valve structures on line 4—4 of Fig. 1.

Fig. 5 is a vertical section of the valve structure on line 5—5 of Fig. 4.

Fig. 6 is a side elevation of the structure shown in Fig. 5.

Fig. 7 is a cross section of the extensible jack on line 7—7 of Fig. 8.

Fig. 8 is a vertical section on line 8—8 of Fig. 7.

Fig. 9 is a vertical section thru the cowl or instrument board showing the remote manually operable means to control the position of the individual jacks and operate their valve mechanisms.

Fig. 10 is an enlarged perspective of one of the manually operable controls shown in Fig. 9.

Figs. 11, 12 and 13 are each elevations looking toward either the front or rear of the vehicle. These views respectively show the lifting jack in the elevated, horizontally extending position; the partly extended operative position; and the fully extended operative condition wherein it supports a disabled wheel in an elevated position.

Referring in detail to the drawings, the illustrated embodiment of the invention comprises three main units, viz., the jack proper or extensible and swingable assembly 10, the mounting member 11, which is fixed to the vehicle axle 12, the valve casings 13 and 14 together with the valve mechanisms within them, and the manually operable remote control assembly 15 detailed in Fig. 9. An extensible assembly 10 is provided for each vehicle wheel.

The axle 12 is shown H-shaped in cross section and the mounting member 11 secured to it in a horizontally extending relation thereto by means of the bolts 16 and clamping plate 17, said bolts extending from a downwardly directed plate 18 of said mounting member. Said mounting member 11 is also furnished with a bracket having a downwardly directed bearing extension 20 which cooperates with a lug 11a of said bracket to support a rocking shaft or pivot 21.

The extensible assembly 10 is swingingly supported from said shaft 21 by means of ear 22 carried by the cylindrical casing 23, and the shank portion 22a of sector 40, also an extension of said casing. A spring 24 coiled about pivot shaft 21, when not restrained, swings the casing 23 of the extensible assembly up to the position indicated by dotted lines in Fig. 3, simultaneously rocking shaft 21.

Within casing 23 telescopes a cylindrical piston 25 the external diameter of the body portion of which is sufficiently small to afford room for a coiled spring 26, the lower end of said spring engaging an annulus 27 secured within the lower end of casing 23 and the upper end thereof engaging the piston head 28 formed upon the upper end of piston 25.

Within cylindrical piston 25 is mounted a plunger or internal piston 30 provided at its upper end with a head 31 which fits with a working fit within the cylindrical piston 25. The lower end of piston 30 works within an annulus 32 secured within piston 25. By this construction an annular space is afforded for a spring 33 which operates between said annulus and the head 31 of the piston 30, the latter piston carrying at its lower end a base plate 34 secured thereto by a screw 35. Springs 26 and 33 normally hold the pistons 25 and 30 telescoped within casing 23.

A cap 36 screws into the upper end of the piston casing 23 thus completing a chamber 37 to which a fluid to operate the pistons is supplied under pressure thru the inlet port 37x with which conduit 77x communicates.

The sector 40 has a grooved periphery to receive a flexible operating connection 41 whereby said sector may be operated to swing the jack assembly 10 down to the pendant position against the opposition of spring 24. Said connection affords uniting means to manually operate the jack and control the check valve presently to be described.

Coincidentally with the performance of the aforesaid swinging movement of assembly 10 the valve mechanism shown in section in the upper portion of Fig. 3 is operated. The cylindrical casing 14 of said mechanism contains a slidable check valve having a head 42 furnished with an axial guiding and supporting rod 43. Said casing has an interior support 44 provided with a passage within which said rod slides, there being ducts 45 at each side of this support communicating with the valve chamber 46. A valve seat 47 is provided against which, when the valve is closed, the head 42 is held by a compression spring 48. An apertured plug 49 screws into the left end of casing 14.

The right hand portion of chamber 14 has within it a cylindrical chamber 50 closed at its right end by a screw plug 51, and valve operating rod 52, said rod having a working, fluid-tight fit thru an inner plug 53 within said plug 51. Plug 51 is internally threaded to cooperate with plug 53 to form a stuffing box. Rod 52 has a disc 54 fixed to its inner end against which a coil spring 55 of greater tensile strength than the spring 48, when unopposed, acts to unseat the valve disc 42. The outer end of rod 52 is furnished with an operating head 56.

To the left edge of the sector 40, as viewed in Fig. 3, is secured a leaf spring 57. The free end of said spring projects beyond the periphery of said sector, and the resiliency of said spring normally holds said spring in a spaced relation to the part of the sector to which it is attached as indicated by the dotted lines. The operating connection 41 is secured to said spring in a spaced relation to the free end thereof. Said connection has axially secured thereto a small cylindrical body 58 which has a working fit within a guiding sleeve 59 that extends from a bracket 60 mounted upon the member 11. Said sleeve 59 extends tangentially with relation to the sector 40.

Below the sleeve 59 there is mounted upon the bracket 60 a detent 61 pivotally supported at 62 and having an angularly extending operating arm 63. Said arm 63 has an upwardly directed swell or cam 64 which extends into sleeve 59 into the path of the tripping body 58. The detent 61 is normally held vertical by a compression spring 65. The casing 23 of the jack carries a latch arm 66 which normally cooperates with the detent 61 to lock the jack in its horizontal position.

The device is constructed in such a manner that the jack can be extended by oil supplied thereto under pressure from the same source as that which supplies oil pressure for operating the brakes of a four-brake car. In Figs. 4 and 5 is shown in sectional detail the preferred construction of a three-way valve for the purpose just stated. The casing or block 13 is furnished with a tapered bore within which a tapered 3-way valve plug 67 has a working fit. Said valve plug 67 has a recess in its large end which contains a compression spring 68. A face plate 69 overlies this recess and affords an abutment for said spring to enable it to keep the valve plug snugly seated. Said plug 67 has a short polygonal operating stem 71 which fits into a correspondingly shaped socket 72 (Figs. 1 and 2) provided therefor in the end of shaft 21. The valve plug 67 has a diametrical passage 73 and a radial passage 74. With these passages cooperate the block or casing passages 75, 76 and 77, the latter passage leading to the valve casing 14 via the pipe 77a. The hose 78 is connected by the fitting 78x to the chamber 46 in valve casing 14 (Fig. 3). The valve casing 13 may be secured to the support 11 by screw bolts 79. The passage 75 thereof leads, thru pipe 80, to an individual brake cylinder, the passage 76, thru pipe 81, to the master brake cylinder, and the passage 77, through pipe 77a, to the chamber 50 of the valve casing 14.

In order to releasably lock the swingable jack casing 23 in its vertical, operative position a spring pressed detent 85 is mounted upon a pivot 86 carried by the supporting means. With said detent cooperates a latching lug 87 carried by the casing 23. Said detent is releasable by reason of the beveled lower end thereof being in an operative relation to a vertically sliding rod 88 having at its upper end a bevel 89 which, after the extensible jack begins to contract, disengages the detent 85 from the lug 87 and thereby allows the jack to swing up to its inoperative position. Said rod 88 has a limited sliding movement within apertured lugs 90 and 91 on casing 23. A stop shoulder 88x on said rod engages lug 91.

In Fig. 9 is shown, adjacent to the steering wheel 94, an instrument board 95 upon which is mounted means for manually exerting traction upon the connection 41 already referred to, and also for operating three other connections 96 for the three other jacks with which the vehicle is to be supplied. To said instrument board is secured the set of four guide sleeves 97 within which slide the rods 98 having manually grippable heads 99. One of the sleeves 97 is detailed in Fig. 10 where it is shown furnished with a mounting plate 100 and with a longitudinal internally grooved rib 101, thus affording a passage for a locking lug 102 in order that, by slightly rotating whichever rod has been extended, said lug may be positioned to prevent its retraction till desired. A stop screw 103 may be used on each rod to limit its extension.

In Fig. 12 the vehicle wheel 104 is shown having a deflated tire 105, the jack being shown in its pendant position preparatory to being extended. In Fig. 13, after extension of the jack, the wheel is seen to be sufficiently elevated to cause said tire to clear the surface of the roadway.

Referring to certain details of construction, the head 28 of the cylindrical piston 25 has an external, peripheral groove 110 of a broad character wherein is placed an expansible gasket 111. Along its lower edge this gasket has an inwardly directed rib or flange 112. The groove 110 has an inclined bottom, thus making it increase in depth toward the outer end of the piston, its depth at the latter location being further increased by an internal groove as shown. The gasket is sufficiently elastic to enable it to be put into place.

The inclined duct 113 in the piston head leads to the bottom of groove 110 to supply fluid pressure from the piston chamber 37 to the inner surface of the gasket to hold it snugly in contact with the external piston cylinder during operation. The head 31 of the internal piston is likewise furnished with an inclined duct 114 and with a groove 115 to receive an elastic gasket 116. These features are patterned after the packing construction already described.

Below the annulus 27 (see lower part of Fig. 8) a wiper gasket 120 is secured in place by screws 121, the same screws serving as a fastening means for said annulus. A like wiper gasket 122, secured by screws 123 is provided for the inner piston 30. These wiper gaskets remove from the pistons, during their retraction, any dust or dirt which may have accumulated on them during the operation of the jack.

In operation, in order to swing the jack casing 23 provided for a given wheel down to its operative position from its elevated inoperative position wherein it is normally retained by the catch 61 (see Fig. 3), the operator will apply traction to the proper rod 98 (see Fig. 9). The flexible connection 41 of Figs. 3 and 9 is shown having thus been extended. The first effect of traction applied thereto will be to cause the tripping body 58 attached to connection 41, to engage the swell 64 on detent arm 63, it being understood that when the jack is up the trip 58 will be a little to the left of said swell as viewed in Fig. 3.

As the connection 41 is pulled farther the jack casing 23 is swung down to its operative position against the opposition of its elevating spring 24. At this time the foot 34 is not extended, therefore the catch 85 does not as yet take hold. After the rod 98 to which the connection 41 is secured has been completely extended it is turned and the lug 102 prevents its premature retraction. As said rod approaches its complete extension, the free end portion of spring 57 is moved to act upon the head 56 of rod 52 thus sliding said rod outwardly a short distance and permitting valve 42 to be closed by the action of its spring 48 except when liquid under pressure from the foot pump is being forced thru it. At this time the three-way valve 67, connected with the turnable pivot shaft 21, will have been opened thus closing the fluid lines to the individual brake cylinders and placing the pressure chamber 37 of the jack into communication with master brake cylinder. Then, by using the brake pedal as a pumping means, oil is forced from the master brake cylinder into said pressure chamber thus extruding the two cooperating pistons and causing the jack to elevate the disabled wheel, as shown in Fig. 13.

The pressure fluid from the master brake cylinder (not shown) enters the valve casing 13 (Fig. 4) thru pipe 81, and thence passes thru passage 76, radial passage 74, diametrical passage 73, thence thru passage 77 and pipe 77a to cylindrical chamber 50 (Fig. 3), thence thru duct 45, valve chamber 46, fitting 78x, hose 78, fitting 77x, and the port 37x which communicates with the pressure chamber 37.

The function of the detent-operating rod 88 is to release the detent 85 when, under the action of the retraction springs 26 and 33, the extensible foot 34 has nearly reached its completely retracted position.

It should be understood that the present disclosure is for the purpose of illustration only and that this invention includes all modifications and equivalents which fall within the scope of the subject matter claimed.

What is claimed is:

1. In combination, a vehicle axle, a support mounted on said axle, valve structures mounted on said support, a lifting jack operable by fluid pressure, said jack being pivotally attached to said support to swing from an elevated inoperative position down to a position for elevating the vehicle axle, the pivot of said jack turning therewith, a sector in a fixed relation to said jack to swing therewith, the arc of said sector being described substantially from the pivotal attachment of said jack, a radially extending leaf spring secured to said sector, said spring having an end portion which projects beyond the arc of said sector and tends to spring out into a spaced relation to said sector, there being an operating connection between the free end portion of said spring and one of said valve structures, and also an operating connection between the pivot of said jack and the other of said valve structures, a spring tending to maintain said jack in its elevated position, and a manually operable connection or cord traveling upon the arc of said sector and secured to the end portion of said leaf spring to swing said jack down to an operative position against the opposition of its spring and simultaneously cause one of said valve structures to be operated to supply operating fluid under pressure thru the medium of the other valve structure to the jack.

2. In combination, a vehicle axle, a support mounted on said axle, a lifting jack operable by fluid pressure, said jack being pivotally attached to said support to swing from an elevated inoperative position down to a position for elevating the vehicle axle, the pivot of said jack turning therewith, a spring tending to maintain said jack in its elevated position, a manually operable connection or cord to swing said jack down to an operative position against the opposition of said spring, and two valve mechanisms to control the supply of operating fluid to said jack, there being a movable part to which said cord is attached whereby traction upon said cord actuates one of said valve mechanisms, there also being an operative connection between the other of said valve mechanisms and the aforementioned pivot.

3. In combination, a vehicle frame, a fluid pressure operable lifting jack mounted on said frame to swing from an inoperative to an operative position, two valves to control the supply of operating fluid to said jack, one of said valves being a check valve normally in an inoperative condition, and means whereby the swinging of said jack to its operative position places said check valve in an operative condition and opens the other valve to admit the operating fluid.

4. In combination, a vehicle axle, a lifting jack, means to swingably attach said jack to said axle to swing from a pendant to a substantially horizontal position, catch means to releasably maintain said jack in its pendant position, means to conduct fluid pressure to said jack to change it from a retracted to an extended condition, means to retract said jack, and means to release said catch actuated by said jack during the final stage of its retraction.

5. In combination, a vehicle axle, a lifting jack, means to swingably attach said jack to said axle to swing from a pendant to a substantially horizontal position, catch means to releasably maintain said jack in its pendant position, means to conduct fluid pressure to said jack to change it from a retracted to an extended condition, means to automatically retract said jack, and a tripping rod to release said catch, said rod being actuated by said jack during the final stage of its retraction.

6. In combination, a vehicle axle, a support fixed to said axle, a jack extendable by fluid pressure and mounted on said support to swing from a laterally extending to a pendant position, a spring tending to maintain said jack in its laterally extending position, catch means to releasably maintain said jack in its pendant position against the opposition of said spring, means to retract said jack, and a slidable tripping rod positioned to engage said catch in an endwise manner to effect its release, said rod being engageable by a retractable portion of the jack to cause it to release said catch as aforesaid.

7. In combination, a vehicle frame, an extensible fluid pressure operable lifting jack mounted on said frame to swing from an inoperative to an operative position and vice versa, means tending to retract said jack after extension and thus expel the operating fluid therefrom, a detent to releasably maintain said jack in its inoperative position, there being a passage to supply operating fluid to said jack and permit its escape therefrom, said passage being provided with a check valve having a spring to close it and valve operating means when unopposed to open it, said valve being normally adapted also to operate in conjunction with a supply pump, a manually operable cord to swing said jack from its inoperative to its operative position, a cord-attaching spring connecting said cord with said jack, said cord attaching spring being operatively related to said valve operating means to keep the latter from functioning when the cord is fully retracted, means tending to open said check valve in opposition to its spring to allow the operating fluid to be expelled from the jack when the traction on said cord is relaxed, said cord-attaching spring permitting traction upon said cord to impart a slight initial movement to the cord independently of the jack, and means whereby said initial independent movement of the cord releases said detent.

8. The subject matter of claim 7 and, said cord-attaching spring being a leaf spring having one end portion in a fixed relation to said jack, and having a free end portion to which said cord is attached.

9. In an extensible lifting jack operable by liquid pressure, liquid supply means for said jack comprising a passage furnished with a check valve, a valve spring tending to close said valve to prevent premature escape of the extending liquid from the jack, valve opening means tending to hold said valve open, said valve opening means being furnished with a spring of sufficient strength to overcome the opposition of said valve spring, and manually operable means to maintain said valve opening means in an inoperative condition while liquid under pressure is being supplied to and contained within the jack.

10. In an extensible lifting jack operable by liquid pressure, liquid supply means for said jack comprising a passage furnished with a check valve, a valve spring tending to close said valve to prevent premature escape of the extending liquid from the jack, valve opening means tending to hold said valve open, said valve opening means being furnished with a spring of sufficient strength to overcome the opposition of said valve spring, means whereby said jack is mounted on a vehicle frame to swing from an upper inoperative position to a lower operative position, and a unitary means which is manually operable both to swing said jack to its operative position and to maintain said valve-opening means in an inoperative condition during the time that it is necessary for said check valve to function.

11. In combination, a vehicle frame, a mounting means secured to said frame, a lifting jack swiveled to said mounting means to swing from an elevated inoperative position to a downwardly projecting operative position, a detent supported by said mounting means to releasably maintain said jack in its elevated position, a cord attached to said jack to swing it down to its operative position when traction is applied to said cord, guiding means adjacent to said detent being provided for said cord and there being a yielding connection between said cord and jack thus permitting a slight initial movement of the cord before the downward swing of the jack begins, and a body secured to said cord to travel along said guiding means and release said detent during the aforementioned initial movement of the cord.

12. The subject matter of claim 11 and, said detent being furnished with a cam element engageable by said body to effect the release of the detent.

13. In combination, a vehicle frame, a lifting jack mounted on said frame to swing from an inoperative upper position to a lower operative position, said jack being extensible by fluid pressure when it is in its operative position, there being a check valve to admit fluid to extend the jack and retain it therein during use, a spring to swing said jack up to its inoperative position after use, manually operable means to swing said jack down to its operative position against the opposition of said spring and then temporarily lock it in said position, spring means tending to retract said jack after extension thus expelling the extending fluid therefrom, and automatic means put into action by the unlocking of said manually operative means to unseat said check valve and maintain it open while the jack is being retracted.

SIGFRED E. ANDERSON.